United States Patent [19]

Iseki et al.

[11] 4,026,863

[45] May 31, 1977

[54] FLUOROCARBON POLYMER COMPOSITE CONTAINING A TREATED FILLER

[75] Inventors: Shigeru Iseki, Tokyo; Mituharu Morozumi, Yokohama; Shoji Atsuta, Kyoto, all of Japan

[73] Assignee: Asahi Glass Co., Ltd., Tokyo, Japan

[22] Filed: June 7, 1976

[21] Appl. No.: 693,684

[52] U.S. Cl. .................. 260/42.14; 260/42.17; 260/42.18; 260/42.22; 260/900; 428/361; 428/375

[51] Int. Cl.² .................................... C08K 9/04

[58] Field of Search ............... 260/900, 42.14; 428/361, 375

[56] References Cited

UNITED STATES PATENTS

| | | | |
|---|---|---|---|
| 3,340,222 | 9/1967 | Fang | 260/900 X |
| 3,453,208 | 7/1969 | Gallagher et al. | 252/12 |
| 3,856,735 | 12/1974 | Blackwell | 260/29.6 F |
| 3,857,852 | 12/1974 | Tieszen | 260/29.6 F |

Primary Examiner—Carman J. Seccuro
Attorney, Agent, or Firm—Oblon, Fisher, Spivak, McClelland & Maier

[57] ABSTRACT

A fluorocarbon polymer composite comprises a fluorocarbon polymer and a filler in a form of powder, granules, beads, fiber, fabric sheet or a like which is treated with polyphenylene sulfide.

14 Claims, No Drawings

FLUOROCARBON POLYMER COMPOSITE CONTAINING A TREATED FILLER

BACKGROUND OF THE INVENTION

The present invention relates to a fluorocarbon polymer composite which comprises a fluorocarbon polymer and a filler in a form of powder, granules, beads, fiber, fabric sheet or a like.

It has been known that fluorocarbon polymers such as tetrafluoroethylene polymer have excellent heat resistance, chemical resistance and electrical and mechanical characteristics.

It has been also known to blend suitable filler such as glass fiber, carbon fiber, metal oxide, etc. to the fluorocarbon polymer in order to improve creep resistance, abrasion resistance and various other characteristics. Certain effects of the blend have been found.

However, the fluorocarbon polymers themselves have characteristics of non-tackiness to be poor for bonding on the filler whereby the satisfactory filler effect has not been expected.

In order to overcome the above-mentioned disadvantages, it has been proposed to improve dispersibility of a filler in a fluorocarbon polymer, for example, by a method of blending the filler which have substantially same particle diameter and shape with those of the fluorocarbon polymer. In accordance with these conventional methods, the filler effects such as reinforcing property etc. are inferior to give low efficiency.

In the conventional methods, the minimum length required for the filler effect or the aspect ratio of the filler (ratio length to diameter of fiber) has not been considered.

SUMMARY OF THE INVENTION

It is an object of the present invention to provide a fluorocarbon polymer composite which has satisfactory filler effects of high creep resistance, abrasion resistance and high tensile strength.

The object of the present invention has been attained by providing a fluorocarbon polymer composite which comprises a fluorocarbon polymer and a filler in a form of powder, granules, beads, fiber, fabric sheet or a like which is treated with polyphenylene sulfide and said polyphenylene sulfide being present in an amount within a range of 0.5 to 10 weight percent based on the filler.

DETAILED DESCRIPTION OF THE PREFERRED EMBODIMENTS

The filler used in the invention is not limited to a form of powder, granules, beads and fiber but includes sheet, fabric and other fabricated materials.

When the filler such as glass fiber which is treated with polyphenylene sulfide, is blended to a fluorocarbon polymer, the filler effects are remarkably improved.

For example, when non-treated glass fiber is blended to tetrafluoroethylene polymer, the tensile yield strength (in elastic limit) of the tetrafluoroethylene polymer composite is lower than that of tetrafuoroethylene polymer itself.

When the glass fiber treated with polyphenylene sulfide is blended to tetrafluoroethylene polymer, the tensile yield strength is remarkably improved.

The fluorocarbon polymer composites containing the filler treated with polyphenylene sulfide have superior Rockwell hardness comparing with non-filler products and the composites containing non-treated filler. The amount of the treated filler in the composite can be increased. Thus, the present invention has been attained by the above-mentioned findings.

It has been proposed to blend glass fiber to polyphenylene sulfide or to blend about 0.5 to 10 weight percent of tetrafluoroethylene polymer to polyphenylene sulfide. U.S. Pat. No. (3,487,454). It has been also known to blend a small amount of tetrafluoroethylene polymer to a mixture of polyphenylene sulfide and a filler such as glass fiber.

These conventional methods relate to improvement of polyphenylene sulfide but not to improvement of the fluorocarbon polymers.

When about 20 weight percent of polyphenylene sulfide is blended to tetrafluoroethylene polymer, the tensile yield strength can be improved from about 66 $Kg/cm^2$ of tetrafluoroethylene polymer to about 72 $Kg/cm^2$ of the mixture.

Thus, in accordance with the invention, when about 20 weight percent of glass fiber treated with polyphenylene sulfide (about 3 wt.% of polyphenylene sulfide content), is blended to the tetrafluoroethylene polymer, the tensile yield strength can be improved to about 83 $Kg/cm^2$.

When 20 weight percent of non-treated glass fiber is blended to the tetrafluoroethylene polymer, the tensile yield strength is decreased to about 50 $Kg/cm^2$.

Accordingly, it is clear that the characteristics of the fluorocarbon polymer composite can be remarkably improved by blending the filler treated with a small amount of polyphenylene sulfide.

The fluorocarbon polymers used in the invention can be conventional fluorocarbon polymers such as tetrafluoroethylene homopolymer, tetrafluoroethylene polymer modified with a small amount of hexafluoropropylene and other modified polymers and tetrafluoroethylene-hexafluoropropylene copolymer and the like.

It is preferable to use fluorocarbon polymers having molecular weight of 10,000 to 10,000,000 which made of tetrafluoroethylene component and/or hexafluoroethylene component.

The forms of the fluorocarbon polymers can be powder such as molding powder, fine powder, etc., and aqueous dispersion or organic medium dispersion of the fluorocarbon polymer.

The fillers used in the invention can be glass fiber, graphite, molybdenum disulfide, carbon fiber, bronze, carbon, coke flow, glass beads, metals and metal oxides e.g. cadmium oxide, nickel oxide, in a form of powder, granules, beads, fiber, fabric sheet or the like.

Two or more kinds of the filler can be blended.

Polyphenylene sulfides used in the invention can be prepared by reacting a polyhalo compound with an alkali metal sulfide as disclosed in U.S. Pat. No. 3,354,129, and by reacting a polyhalo aromatic compound with sulfur and a sulfide under melting condition as disclosed in U.S. Pat. No. 2,513,188 and by reacting a metal salt of halothiophenol at the temperature for polymerization as disclosed in BP 962,941.

It is especially preferable for an industrial production to use polyphenylene sulfide as disclosed in U.S. Pat. No. 3,354,129, which can be produced by reacting polyhalo substituted cyclic compound having unsaturated bond between the adjacent rings with alkali metal sulfide at high temperatare in a polar organic solvent.

In general, it is preferable to use the polar organic solvent which dissolves both of alkali metal sulfide and the polyhalo substituted aromatic compound. The resulting polyphenylene sulfides have cyclic structures of polyhalo substituted compound which is coupled by sulfur atom in the repeating units.

From the viewpoints of high heat stability and commercial availability, it is preferable to use polyphenylene sulfides having the repeating units. of

—R — S— wherein R represents a phenylene.

The polyphenylene sulfides have a melting point of about 200° to 485° C preferably 280° to 485° C and preferably have an intrinsic viscosity (at 206°C in chloronaphthalene) of about 0.1 to 0.3 especially 0.13 to 0.23. In the invention, the surface treatment of the filler with the polyphenylene sulfide is not limited and can be carried out by various methods. For example, the surface treatment can be carried out by suspending the polyphenylene sulfide in an inert medium and dipping the filler in the suspension and drying it.

It is also possible to carry out the surface treatment by crushing polyphenylene sulfide in a size of less than 100 $\mu$ preferably about 1 to 50 $\mu$ and blending the fine polyphenylene sulfide with the filler by a dry blend. It is important to carry out the surface treatment to give polyphenylene sulfide at a ratio of 0.5 to 10 weight percent preferably 2 to 5 weight percent based on the filler.

When the amount of polyphenylene sulfide is not enough, the improvement of the filler effect cannot be found. When the amount of polyphenylene sulfide is too much, the characteristics as the fluorocarbon polymer composite containing the filler are deteriorated by imparting properties of polyphenylene sulfide by blending them.

The surface treatment by polyphenylene sulfide can be carried out before blending the filler to the fluorocarbon polymer and also during blending the filler to the fluorocarbon polymer by adding suitable amount of polyphenylene sulfide.

For example, the filler such as glass fiber, the fluorocarbon polymer and the polyphenylene sulfide can be blended in any order of addition to attain the surface treatment. In said case, a wet blending method, a dry blending method or the like can be applied.

In order to improve the filler effect, it is preferable to use the fluorocarbon polymer and polyphenylene sulfide which have each smaller diameter and which have substantially same diameters and are in a range of 1 to 1000 $\mu$ especially about 10 to 50 $\mu$. The size of the filler is not limited and can be in a wide range from fine powder and fiber to fabric and sheet.

In accordance with the invention, the satisfactory filler effect such as reinforcement can be expected. For example, advantageous composites can be prepared by using a fibrous filler having an aspect ratio of 1 to 300 especially 3 to 50. An amount of the filler is not limited and can be various conventional range, and is usually 1 to 80 weight parts especially 5 to 60 weight parts per 100 weight parts of the fluorocarbon polymer. In the invention, the methods of blending the fluorocarbon polymer, the filler and the polyphenylene sulfide and desirable additives are not limited. For example, it is possible to blend them in powdery form at a same time or to blend them during the crushing operation for the starting materials. It is also possible to blend them in aqueous medium or an organic medium or under the addition of an aqueous medium or an organic medium, or to admix the filler with a mixture of the fluorocarbon polymer and polyphenylene sulfide.

The order of the addition can be changed as desired.

It is also possible to impregnate an aqueous dispersion or an organic medium dispersion containing the fluorocarbon polymer and the polyphenylene sulfide, into the fabric made of glass fiber as the filler. In the fluorocarbon polymer composites of the invention, it is possible to add desirable additives such as pigments, lubricants, antistatic agents or the like.

It is also possible to form wet type composites containing an aqueous medium or an organic medium and dry type composites in dry condition. For example, a pigment can be added to prepare colored composites. The fluorocarbon polymer composites of the invention can be prepared by various fabricating methods which have been applied for molding powder and fine powder of the fluorocarbon polymers, such as press molding method, automatic molding method, rubber mold molding method, a ram extrusion molding method, a hot-coining method, a paste extrusion molding method, hot melt extrusion or injection molding method and the likes.

The fluorocarbon polymer composites of the invention can be also used for fabrications of tubes, rods, wire coating, lining and coating and the like. It is possible to use the composites for the conventional fabrication by impregnating it into glass fiber, asbestos or glass mat and heating it. The polyphenylene sulfide can be melted and hardened by continuously heating it at high temperature such as about 260° to 485°C for 5 minutes to 24 hours in an oxygen containing atmosphere. Accordingly, it is possible to apply the polyphenylene sulfide on the surface of filler and to melt and to harden it and then to blend the treated filler to the fluorocarbon polymer.

It is also possible to blend the fluorocarbon polymer, the filler and polyphenylene sulfide and then to heat them to melt and to harden the polyphenylene sulfide.

Having now generally described the invention, a further understanding can be attained by reference to certain specific Examples which are provided herein for purposes of illustration only and are not intended to be limiting in any manner unless otherwise specified.

EXAMPLES 1 TO 4 AND REFERENCES 1 TO 2

A milled glass fiber having an average length of 20 $\mu$ which was prepared by chopping glass fiber having a diameter of about 9 $\mu$ and milling the chopped glass fiber, was used as the filler.

A polyphenylene sulfide (average diameter of 40 $\mu$) which has a melting point of 288° C and a thermal decomposing point of 450° C was admixed with the milled glass fiber at each ratio of 1 wt. part (Example 1), 2 wt. parts (Example 2), 5 wt. parts (Example 3), and 10 wt. parts (Example 4) per 100 wt. parts of the milled glass fiber.

Each mixture was stirred in the conventional juicer type mixer at a peripheral speed of 10 m/sec. for 90 seconds and was heated in an oven at 330° C for 30 minutes whereby the polyphenylene sulfide was cured on the milled glass fiber to prepare four types of polyphenylene sulfide treated glass fiber fillers.

Each of 25 wt. parts of the polyphenylene sulfide treated glass fiber was admixed with 100 wt. parts of a molding powder of polytetrafluoroethylene (PTFE)

(average diameter of 20 μ) and each mixture was stirred in the conventional juicer type mixer at a peripheral speed of 10 m/sec. for 90 seconds.

Thus, the polyphenylene sulfide treated glass fiber-PTFE composites were prepared.

As the references, the non-treated glass fiber-PTFE composite (Reference 1) was prepared by using non-treated glass fiber. In accordance with the conventional molding method, each molded sheet having a size of 100 mm × 100 mm × 3 mm was prepared by preliminarily molding each of the composites under a pressure of 500 Kg/cm² and curing it at 370° C for 3 hours.

Each test piece having a shape of No. 3 dambel of Japanese Industrial Standard K6891 was stamped out from each molded sheet. The tension test of the test piece was carried out at a rate of 20 mm/min. The tensile elastic limit point decided at the point departed from the linear relation of the pattern of stress and strain and the tensile yield strength was measured by dividing the stress at the point by the initial sectional area of the test piece. The results are shown in Table 1. As the reference, a test piece of the molded sheet prepared by using only PTFE powder was tested (Reference 2).

The result is shown in Table 1.

Table 1

|  | Glass fiber/PPS | PTFE/PPS | tensile yield strength (Kg/cm²) |
|---|---|---|---|
| Example 1 | 100/1 | 100/0.2 | 70 |
| Example 2 | 100/2 | 100/0.4 | 80 |
| Example 3 | 100/5 | 100/1 | 85 |
| Example 4 | 100/10 | 100/2 | 80 |
| Reference 1 | 100/0 | 100/0 | 50 |
| Reference 2 | — | — | 60 |

Note:
PPS: polyphenylene sulfide
PTFE: polytetrafluoroethylene

EXAMPLES 5 TO 8 AND REFERENCES 3 TO 7

The glass beads having diameters of 62 to 88μ or the glass fiber having an average length of 20μ was used as the filler.

The polyphenylene sulfide (PPS) having an average diameter of 40μ of Example 1 was admixed with each of the fillers at a ratio of 5 wt. parts per 100 wt. parts of the filler.

Each mixture was cured at 300° C for 60 minutes. The polyphenylene sulfide treated filler was admixed with the molding powder of polytetrafluoroethylene (PTFE) (diameter of 20μ) to prepare the composites shown in Table 2.

As the reference, the non-treated filler was admixed with PTFE to prepare the non-treated filler-PTFE composite in accordance with the process of Example 1.

In accordance with the conventional molding method, each molded disc having a diameter of 50 mm and a thickness of 10 mm was prepareed by preliminarily molding each of the composites under a pressure of 600 Kg/cm² and curing it at 370° C for 3 hours.

As the reference, a molded disc was prepared by using only PTFE powder. Rockwell hardness (R-scale value) of the disc test piece was measured by ASTM D785-65.

The results are shown in Table 2.

Table 2

|  | Composites | Ratio (wt. ratio) | Rockwell hardness H$_R$ |
|---|---|---|---|
| Example 5 | PTFE/glass fiber* | 70/30 | 58 |
| Example 6 | PTFE/glass fiber* | 50/50 | 80 |
| Example 7 | PTFE/glass beads* | 70/30 | 60 |
| Example 8 | PTFE/glass beads* | 50/50 | 73 |
| Reference 3 | PTFE/glass fiber | 70/30 | 42 |
| Reference 4 | PTFE/glass fiber | 50/50 | 26 |
| Reference 5 | PTFE/glass beads | 70/30 | 25 |
| Reference 6 | PTFE/glass beads | 50/50 | 18 |
| Reference 7 | PTFE | 100 | 18 |

*polyphenylene sulfide treated filler (filler 100 wt. parts: PPS 5 wt. parts).

As it is clear from the result of Table 2, it is possible to increase the amount of the polyphenylene sulfide treated filler. Moreover, the effect for improving Rockewell hardness by the addition of the polyphenylene sulfide treated filler is remarkable.

EXAMPLES 9 TO 10 AND REFERENCES 8 TO 9

A fibrous calcium silicate having a length of 20 to 25μ or an α-alumina powder having a diameter of 48μ was used as the filler in accordance with the process of Examples 5 to 8 for curing polyphenylene sulfide on the filler.

The polyphenylene sulfide treated filler was admixed with a modified polytetrafluoroethylene powder (modified PTFE which was prepared by modifying PTFE with 0.2 mole % of hexafluoropropylene) to obtain the composites shown in Table 3.

The modified PTFE powder had a diameter of about 25μ.

In acordance with the process of Examples 5 to 8, each disc having a diameter of 50 mm and a thickness of 10 mm was prepared and Rockwell hardness of the disc test piece was measured.

As the reference, the modified polytetrafluoroethylene composites were prepared by using the non-treated α-alumina and Rockwell hardness of the disc test piece was measured.

The results are shown in Table 3.

Table 3

|  | Composites | Ratio (wt. ratio) | Rockwell hardness (H$_R$) |
|---|---|---|---|
| Example 9 | modified PTFE/α-alumina* | 40/60 | 100 |
| Example 10 | modified PTFE/Ca silicate* | 50/50 | 80 |
| Reference 8 | modified PTFE/α-alumina | 40/60 | 60 |
| Reference 9 | modified PTFE/Ca silicate | 50/50 | 40 |

*polyphenylene sulfide treated filler (filler 100 wt. parts/PPS 5 wt. parts)

EXAMPLE 11 AND REFERENCE 10

A glass fiber chopped strand mat having a bulk density of 0.1 and a thickness of about 0.4 mm was immersed in an aqueous dispersion of polyphenylene sulfide (prepared by dispersing 35 wt. parts of PPS in 100 wt. parts of water and 1 wt. part of nonionic surfactant by a homo-mixer) at a ratio of 2 wt. parts of PPS to 100 wt. parts of the filler, and then the impregnated mixture was dried and cured at 330° C for 30 minutes. The resulting polyphenylene sulfide treated mat was plied between two sheets of film having a thickness of 500μ which is made of tetrafluoroethylene-hexafluoropropylene copolymer (FEP) (15 mole % of C$_3$F$_6$ component), and the plied sheets were compressed at 370° C under a pressure of 10 Kg/cm² to prepare a composite sheet.

As the reference, a composite sheet was also prepared by using the nontreated glass fiber chopped strand mat.

The resulting composite sheet had a thickness of about 1 mm.

Each test piece having a width of 25 mm was prepared from the composite sheets. The tension test of the test piece was carried out in the condition of a cross head gap of 50 mm and a rate of 20 mm/min.. In accordance with the method of Example 1, the tensile yield strength of the test piece was measured.

The results are shown in Table 4 together with the ratio of FEP to glass fiber chopped strand mat.

Table 4

|  | Composites | Ratio (wt. ratio) | tensile yield strength (Kg/cm²) |
| --- | --- | --- | --- |
| Example 11 | FEP/glass fiber mat* | 80/20 | 187 |
| Reference 10 | FEP/glass fiber mat | 80/20 | 152 |

*polyphenylene sulfide treated mat (mat 100 wt. parts/PPS 2 wt. parts).

EXAMPLE 12 AND REFERENCE 11

An aromatic polyamide fiber cloth ( CONEX CT-5210 manufactured by Teijin K.K.) was immersed in the aqueous dispersion of PPS of Example 11 and the impregnated mixture was dried and cured at a ratio of 2 wt. parts of PPS to 100 wt. parts of the cloth.

In accordance with the process of Example 11, the resulting polyphenylene sulfide treated cloth was plied between the two sheets of film made of FEP and the plied sheets were compressed to prepare a composite sheet having a thickness of 1 mm, and the tensile strength test was carried out. The result is shown in Table 5.

As the reference, the result of the composite sheet using the non-treated cloth is also shown in Table 5.

Table 5

|  | Composites | Ratio (wt. ratio) | tensile yield strength (Kg/cm²) |
| --- | --- | --- | --- |
| Example 11 | FEP/cloth* | 80/20 | 237 |
| Reference 11 | FEP/cloth | 80/20 | 133 |

*polyphenylene sulfide treated cloth (cloth 100 wt. parts/PPS 2 wt. parts).

We claim:

1. A fluorocarbon polymer composite which comprises a fluorocarbon polymer and a filler treated with polyphenylene sulfide wherein said polyphenylene sulfide is applied on the surface of the filler and is present in an amount within the range of from 0.5 to 10 weight percent based on the filler.

2. The fluorocarbon polymer composite of claim 1, wherein the filler is in the form of a powder, granules, beads, fiber, fabric sheet or other solid material.

3. The fluorocarbon polymer composite of claim 1, wherein 1 to 80 weight parts of the filler is added to 100 weight parts of the fluorocarbon polymer.

4. The fluorocarbon polymer composite of claim 1, wherein the fluorocarbon polymer is a polymer or copolymer of tetrafluoroethylene and/or hexafluoropropylene.

5. The fluorocarbon polymer composite of claim 1, wherein the filler is a fibrous filler having an aspect ratio of length to diameter of 1 to 300.

6. The fluorocarbon polymer composite of claim 1, wherein the filler is a fibrous mat or a cloth treated with polyphenylene sulfide.

7. The fluorocarbon composite of claim 1, wherein the filler is glass fiber treated with polyphenylene sulfide.

8. In the process of preparing a fluorocarbon composite comprising a fluorocarbon polymer and a filler, the improvement which comprises applying on the surface of the filler from 0.5 to 10 weight percent based on the filler of a polyphenylene sulfide.

9. The process of claim 8, wherein the filler is in the form of a powder, granules, beads, fiber, fabric sheet or other solid material.

10. The process of claim 8, wherein 1 to 80 weight parts of the filler is added to 100 weight parts of the fluorocarbon polymer.

11. The process of claim 8, wherein the fluorocarbon polymer is a polymer or copolymer of tetrafluoroethylene and/or hexafluoropropylene.

12. The process of claim 8, wherein the filler is a fibrous filler having an aspect ratio of length to diameter of 1 to 300.

13. The process of claim 8, wherein the filler is a fibrous mat or a cloth treated with polyphenylene sulfide.

14. The process of claim 8, wherein the filler is glass fiber treated with polyphenylene sulfide.

* * * * *